Patented Oct. 7, 1952

2,613,225

UNITED STATES PATENT OFFICE 2,613,225

α-PHENYLAMINO-PROPIONIC ACID AMIDINE AND ITS SALTS

Karl Miescher, Riehen, and Ernst Urech, Binningen, Switzerland, assignors to Ciba Pharmaceutical Products, Inc., Summit, N. J.

No Drawing. Application June 28, 1951, Serial No. 234,137. In Switzerland July 5, 1950

3 Claims. (Cl. 260—564)

1

The present invention relates to α-phenylamino-propionic acid amidine and its acid salts.

A primary object of the present invention is the embodiment of a new group of compounds possessing the property of stimulating the action of the heart of warm-blooded animals and of effecting coronary dilatation. This object, and others which will be evident from the following disclosure, is realized according to the present invention by α-phenylamino-propionic acid amidine, which corresponds to the formula:

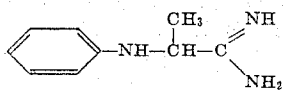

and by salts of this amidine with various acids.

Various phenylamino-alkane carboxylic acid amidines are already known, as for example phenylamino-acetamidine which is most nearly comparable with the new amidine of the present invention. Of the phenylamino-acetamidine, it was known that it possesses a strong effect upon the blood pressure and the blood vessels. In contradistinction to this the amidine of the present invention only exhibits this effect to a minor extent. It does however possess the aforementioned property of stimulating the action of the heart and of effecting coronary dilatation, and it also exhibits certain histamine-like properties. Similar activity was not heretofore known in the case of phenylamino-acetamidine, although it has now been ascertained, in connection with this invention, that it does possess similar properties but only to a very slight extent. Thus, α-phenylamino-propionic acid amidine and its salts, in their effect in dilating the coronary blood vessels are four times as active and as regards their positive effect upon the amplitude of the pulse are five times more strongly active than the said phenylamino-acetamidine. The new compounds can be employed as medicaments for the indicated purpose, namely, stimulating the heart and effecting coronary dilatation.

The new α-phenylamino-propionic acid amidine can be obtained according to the invention by converting α-phenylamino-propionic acid, in the form of an acid derivative, into the amidine. Thus nitrogen-containing functional derivatives of α-phenylamino-propionic acid, as for example its nitrile, amide, thioamide, its N-substituted amidines, its imido derivatives such as imido ethers or thioimido ethers, may be reacted with ammonia, its salts or metal derivatives, such as sodamide or lithium amide or halogen magnesium amide. The amidine may also be produced according to the invention by treating the α-phenylamino-propionic acid amide-oxime with a reducing agent. According to a further modification of the process, aniline is reacted with a reactive ester of α-hydroxy-propionic acid amidine, especially with an ester of a strong inorganic or organic acid, such for example as the hydrohalic acids or the alkyl or aryl sulfonic acids, and more particularly with α-chloro-propionic acid amidine or its salts.

Depending upon the process employed, the new amidine is obtained as the free base or in the form of its salts. From the base, the salts—for example, the hydrohalides, sulphate, nitrate, phosphate, thiocyanate, acetate, propionate, oxalate, malate, citrate, benzoate, methane sulphonate, ethane sulphonate, hydroxyethane sulphonate, benzene sulphonate or toluene sulphonate, etc.—can be produced with the aid of the corresponding acids.

The following examples set forth—solely by way of illustration and not by way of limitation—exemplary embodiments of the invention. In these examples, the relation between parts by weight and parts by volume is the same as that between the kilogram and the liter. Temperatures are expressed in degrees centigrade.

Example 1

50.2 parts by weight of α-phenylamino-propionic acid imidomethyl ether dihydrochloride (produced by reaction of hydrogen chloride upon a mixture of equivalent quantities of α-phenylamino-propionic acid nitrile and methyl alcohol in chloroform solution) are introduced within 30 minutes while cooling with ice, into alcoholic ammonia, whereupon the temperature is maintained for 2 hours at 20° and 2 hours at 50°. After removing the concomitantly-produced ammonium chloride by suction filtration, the solution is evaporated to dryness and the residue recrystallized from acetone and then from alcohol or a small quantity of water. There is thus obtained the α-phenylamino-propionic acid amidine monohydrochloride which melts at 197–198°. It is easily soluble in water. From the aqueous solution, concentrated caustic soda solution precipitates the free base which after recrystallization from benzene melts at 109–111°. From the base, dissolved in alcohol, ethyl acetate, or ether, there are obtained by the addition of an equivalent quantity of an acid the corresponding imidazoline salts, such as the hydrobromide, sulfate, acetate, propionate, methane sulfonate, or toluene sulfonate. From the concentrated aqueous solution of the hydrochloride there are obtained by the addition of a concentrated aqueous solution of sodium iodide, sodium thiosulfate, sodium nitrate, or ammonium thiocyanate, the corresponding iodide, thiosulfate, nitrate, or thiocyanate.

Instead of the α-phenylamino-propionic acid imidomethyl ether dihydrochloride, an equivalent quantity of the imidoether of another alcohol can be used for the reaction, as for example the imidoether of ethyl alcohol, propyl alcohol or cyclohexyl alcohol; the corresponding thioimido ether can also be used. Instead of the dihydrochloride, the free base can be reacted, if desired in the presence of an ammonium salt such as ammonium chloride, or alternatively another salt of the imidoether, such as the dihydrobromide may be employed in lieu of the dihydrochloride. The ethyl alcohol employed as solvent can also be replaced by another solvent which is inert with respect to the imidoether.

Example 2

Into 100 parts by volume of methanolic ammonia containing 8.5 parts by weight of ammonia, 1.0 part by weight of hydrogen sulphide is passed while cooling, 14.6 parts by weight of α-phenylamino-propionic acid nitrile, 10.6 parts by weight of ammonium chloride, 20 parts by volume of water and 1 part by volume of triethylamine are added and the whole is heated for 12 hours to 45–60° in a closed vessel in a nitrogen atmosphere. The solvent is then distilled off in vacuum. The residue from the evaporation is taken up in water and ether and from the aqueous solution the α-phenylamino-propionic acid amidine is precipitated as the base, with the aid of concentrated caustic soda solution. The base is taken up in ether and, after expelling the ether, crystallized from benzene. It is identical with the base of Example 1.

Example 3

13.0 parts by weight of α-phenylamino-propionic acid thioamide, dissolved in 100 parts by volume of alcoholic ammonia, are treated with the alcoholic solution of 27.1 parts by weight of mercuric chloride and the mixture is shaken in a closed vessel first for 20 hours at 25° and then for a further 5–8 hours at about 45°. After removing the produced mercury sulphide by suction filtration, the solution is evaporated and the residue dissolved in about 100 parts by volume of normal hydrochloric acid and ether. From the hydrochloric acid solution, the α-phenylamino-propionic acid amidine is precipitated with concentrated caustic soda solution. It is identical with the base of Example 1.

The α-phenylamino-propionic acid thioamide (melting point 130–131°) is obtained by prolonged standing of a solution saturated with hydrogen sulphide, of α-phenylamino-propionic acid nitrile in alcoholic ammonia in the presence of a little triethylamine.

Example 4

14.3 parts by weight of α-chlorethyl-formamidine hydrochloride (produced by heating α-hydroxyethyl-formamidine hydrochloride with thionyl chloride), 23.2 parts by weight of aniline and 1 part by weight of sodium iodide are heated for 6 hours in a nitrogen atmosphere to 120–140°. After cooling to about 80°, 150 parts by volume of water are added and then, while cooling with ice, 40 parts by volume of 2-normal caustic soda solution are added dropwise, whereafter the precipitated aniline is extracted with ether. To the aqueous solution concentrated caustic soda solution is added and the precipitated base is extracted with methylene chloride. After drying the methylene chloride solution over potassium carbonate, the solvent is distilled off and the residue recrystallized from benzene whereby the α-phenylamino-propionic acid amidine, melting at 109–111°, is obtained.

Having thus disclosed the invention, what is claimed is:

1. A member selected from the group consisting of α-phenylamino-propionic acid amidine and its salts with acids.
2. α-Phenylamino-propionic acid amidine.
3. α-Phenylamino-propionic acid amidine mono-hydrochloride.

KARL MIESCHER.
ERNST URECH.

REFERENCES CITED

The following references are of record in the file of this patent:

FOREIGN PATENTS

| Number | Country | Date |
|---|---|---|
| 528,915 | Great Britain | Nov. 11, 1940 |